Figure 1:
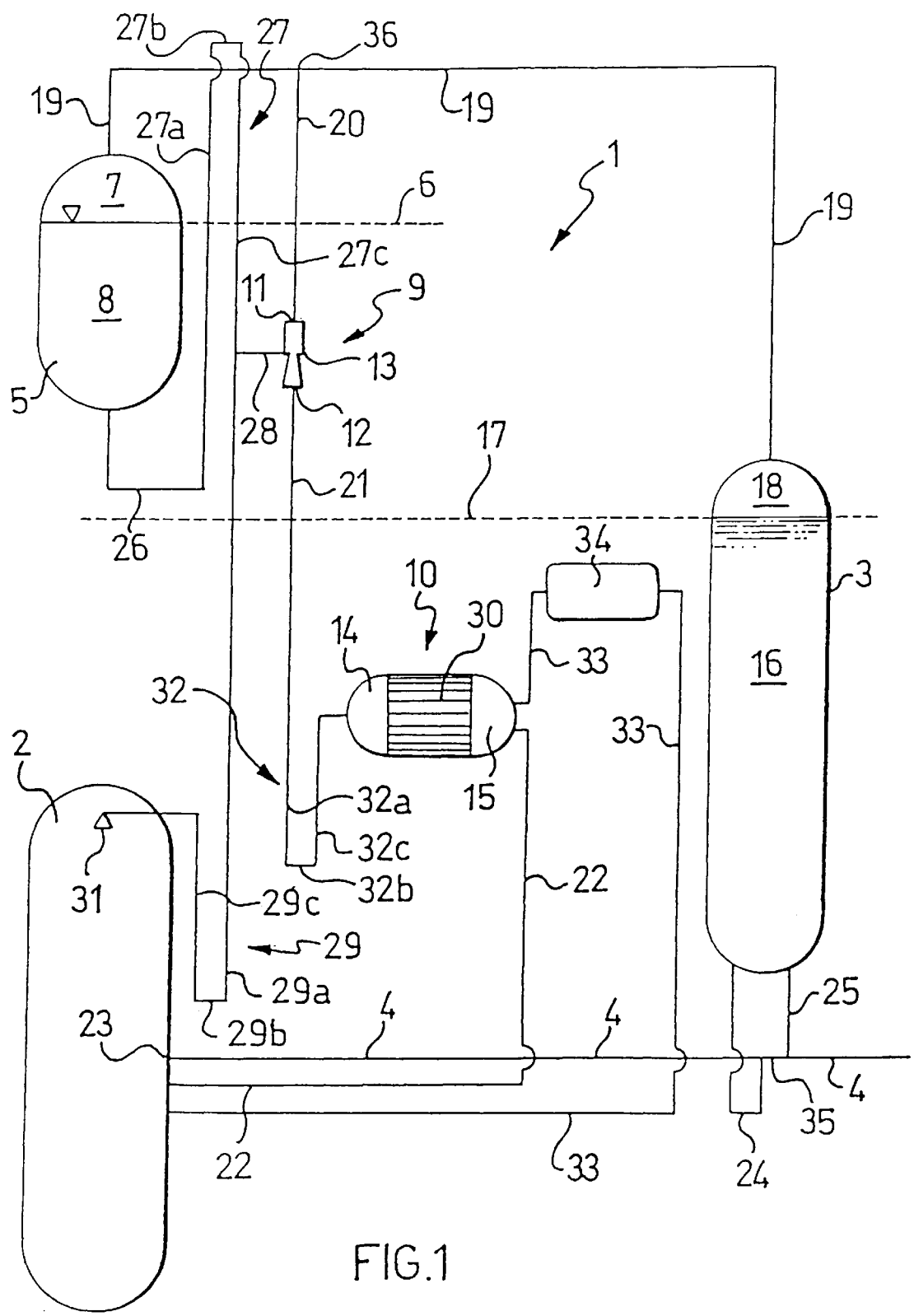

United States Patent [19]
Mansani et al.

[11] Patent Number: 5,943,384
[45] Date of Patent: Aug. 24, 1999

[54] DEPRESSURIZATION SYSTEM FOR PRESSURIZED STEAM OPERATED PLANT

[75] Inventors: Luigi Mansani; Gianfranco Saiu; Alessandro Alemberti; Luciana Barucca, all of Genoa, Italy

[73] Assignee: Finmeccanica S.p.A. Azienda Ansaldo, Italy

[21] Appl. No.: 08/983,282

[22] PCT Filed: Jul. 16, 1996

[86] PCT No.: PCT/EP96/03127

§ 371 Date: Mar. 30, 1998

§ 102(e) Date: Mar. 30, 1998

[87] PCT Pub. No.: WO97/04460

PCT Pub. Date: Feb. 6, 1997

[30] Foreign Application Priority Data

Jul. 20, 1995 [IT] Italy .................................. MI95A1567

[51] Int. Cl.$^6$ .................................................. G21C 9/004
[52] U.S. Cl. .................. 376/283; 376/282; 376/299; 376/407
[58] Field of Search .................................. 376/282, 283, 376/299, 307, 372, 392, 407; 165/110

[56] References Cited

U.S. PATENT DOCUMENTS 5,661,769 8/1997 Mansani et al. ........................ 376/283

FOREIGN PATENT DOCUMENTS

| 32347 | 7/1981 | European Pat. Off. | .......... G21C 9/00 |
| 61-184388 | 8/1986 | Japan | ................................ F28B 9/08 |
| WO95/09425 | 4/1995 | WIPO | ............................ G21C 9/004 |
| WO95/24719 | 9/1995 | WIPO | ............................ G21C 9/004 |

*Primary Examiner*—Daniel D. Wasil
*Attorney, Agent, or Firm*—Sofer & Haroun, LLP

[57] ABSTRACT

A depressurization system (1) for pressurized steam operated plant employing injection of cold water contained in a superelevated tank (5), said injection being triggered rapidly and in a manner independent of the magnitude of the damage and of the presence of incondensible gases, by means of a natural circulation of steam in a closed loop of pipes (19, 20, 21, 22) around said plant (2, 3, 4), caused by the condensation of steam in a condenser (10), placed on said pipes, during the occurence of an accident, comprises a first siphon-type hydraulic shutoff (32), on said pipe loop (19, 20, 21, 22) and arranged close to the inlet collector (14) of said condenser (10), a second siphon-type hydraulic shutoff (29), on the cold water delivery pipe (26) and placed close to the pressurized steam operated plant (2, 3, 4), said second siphon-type hydraulic shutoff (29) being below said first siphon-type hydraulic shutoff (32).

6 Claims, 2 Drawing Sheets

DEPRESSURIZATION SYSTEM FOR PRESSURIZED STEAM OPERATED PLANT

DESCRIPTION

The present invention relates to a system for depressurizing pressurized steam operated plant.

The system is of the type in which cold water contained in a tank which is superelevated with respect to the pressurized plant, is injected under gravity.

As is known, this type of system is used to guarantee maximum safety in the event that pressurized plant suffer accidents which require the immediate depressurization of the plant.

A typical application is in the field of water-cooled nuclear reactors in which depressurization, in the event of a serious accident, consists in injecting directly into the container of the nuclear reactor or into the primary circuit, a large quantity of cold water which condenses the steam present and lowers the average temperature of the plant, with a consequent drop in the internal pressure.

Following this depressurization it will then be possible to bring in other accident mitigating systems.

An essential requirement in this sphere is that the depressurization system should come into action without any possibility of failure, which would have devastating effects because said other mitigating systems would be ineffective.

In this respect depressurization systems are known which employ injection, under gravity, of liquid coolant operating passively, i.e. able to fulfil their functions solely on the basis of physical laws, by virtue of suitable mechanical/functional and structural design.

In the systems mentioned above, the injection of liquid coolant is not triggered through the use of automatic logic enablers, by control systems, or manual ones, by operators. This therefore does not require the intervention of special actuation members such as, for example, valves, nor the presence of sources of external energy.

Patent Application No. WO 95/09425 describes a depressurization system in which the injection of water is triggered by means of a pressure reduction induced in the throat of an ejector traversed by steam from the plant to be depressurized condensing in a condenser forming part of the depressurization system.

This condenser, during normal operation of the plant, is flooded by water from the plant, whereas, should an accident occur, this condenser is gradually uncovered by the evaporation of the water, becoming operational and bringing about said circulation of steam.

The depressurization system described above has the drawback of triggering the injection of cold water at a speed proportional to the rate at which the plant is draining. In particular, in the case of accidents which involve ruptures in the plant of limited flow section, the triggering rate is too slow.

In addition to a delay in the triggering of the injection of cold water, the aforesaid system has the drawback of suffering from the presence of incondensibles in the steam, their presence further slowing down the condensation of the steam to the point where triggering is precluded.

The technical problem underlying the present invention is how to provide available a depressurization system for pressurized plant such as to overcome the drawbacks mentioned with reference to the prior art.

This problem is solved by a depressurization system for pressurized steam operated plant employing the injection, under gravity, of cold water contained in a tank which is superelevated with respect to said plant, said plant comprising a steam headspace defined by a liquid level during normal operation, said depressurization system comprising:

- a pipeline, connected to said steam headspace and forming a closed loop around said plant;
- a condenser, placed below said liquid level, which has an inlet collector and an outlet collector;
- a delivery pipe which connects said tank with said plant;
- an ejector, on said pipeline, which has an entrance section, an exit section and a throat;
- a pressure relief pipe which connects said delivery pipe and the throat of said ejector;

said injection being triggered by a natural circulation of steam in said closed loop caused by the condensation of steam from the plant in said condenser during the occurrence of an accident, characterised in that it comprises:

- a first siphon-type hydraulic shutoff, on said pipeline and arranged close to the inlet collector of said condenser;
- a second siphon-type hydraulic shutoff on said delivery pipe and placed close to the pressurized steam operated plant;

said second siphon-type hydraulic shutoff being below said first siphon-type hydraulic shutoff.

The principal advantage of the depressurization system according to the invention is its rapid triggering, which occurs independently of the magnitude of the damage from which the accident stems.

Further characteristics and advantages of the invention will emerge more clearly from the description of an example of the actuation of the depressurization system for pressurized plant, applied to a pressurized light-water nuclear reactor, given hereinbelow with reference to the appended drawings by way of non-limiting illustration.

In these drawings:

FIG. 1 represents diagrammatically a pressurized plant depressurization system according to the invention; and FIG. 2 represents diagrammatically the depressurization system of FIG. 1 on the occurrence of an accident.

In the drawings a pressurized steam operated plant depressurization system is indicated overall as 1.

Said plant consists, in this example of the actuation of the system 1 according to the invention, of a thermonuclear plant, designed, for example, to produce electrical energy. The drawings show a pressurized vessel 2 containing the core, not shown in the drawings, of nuclear fuel for the plant, a pressurizer 3 and a hot leg 4 of the pressurized circuit of said plant. The hot leg is connected to the pressurized vessel 2 at an aperture 23 thereof.

The hot leg 4, in the region of said pressurizer 3, comprises a limb 35.

The aforementioned components 2, 3, 4 interact with the depressurization system 1 and with one another, as will be described subsequently.

The depressurization system 1 comprises a main tank 5 filled, up to a level 6, with cold water which, according to a preferred embodiment of the invention, contains, in solution, an element capable of inhibiting the nuclear fission reaction, for example boron.

The level 6, for convenience of description, divides the main tank 5 into an upper part 7 and a lower part 8.

In fact, the tank 5 may also be completely filled with water and the level 6 may be located inside pipes situated above the main tank 5 and communicating therewith.

The depressurization system 1 also comprises an ejector 9 and a condenser 10.

The ejector 9 has an entrance section 11, an exit section 12 and a throat 13.

The condenser 10, preferably of the type with straight tubes indicated 30, has an inlet collector 14 and an outlet collector 15.

The thermonuclear plant comprises, inside the pressurizer 3, a hot water volume 16 and a steam headspace 18 situated above said hot water volume 16, defined by a liquid level 17.

The main tank 5 is superelevated with respect to the entire pressurizer 3 and the ejector 9 which, in turn, is completely superelevated with respect to the level 17 of the hot water volume 16 inside the pressurizer 3, whereas the pressurized vessel 2 and condenser 10 are completely below said level 17.

The depressurization system 1 comprises a first, a second and a third link pipes indicated 19, 20, 21 respectively, and an injection pipe 22.

The first link pipe 19 is arranged between the steam headspace 18 and the tank 5, at its upper part 7.

As a result, the main tank 5 and the pressurizer 3 are at the same pressure.

In the figures it may be observed how the level 6 can be situated inside the first link pipe 19 through which, during normal operation of the reactor, a small quantity of condensed steam is received from the pressurizer 3. This small quantity is intended to drip into the main tank 5.

The second link pipe 20 is arranged between the first link pipe 19 and the entrance section 11 of the ejector 9, branching off from a union 36, on the first pipe 19.

The third link pipe 21 is arranged between the exit section 12 of the ejector 9 and the inlet collector 14 of the condenser 10, while the injection pipe 22 is arranged between the outlet collector 15 and the pressurized steam operated plant, in this illustrative embodiment over the cylindrical vessel 2, below its aperture 23.

In accordance with the present example of a preferred embodiment according to the invention, the pressurized steam operated plant, interacting with said depressurization system 1, and in particular said thermonuclear plant, comprises a first and a second conduits, indicated 24 and 25 respectively.

The first and second conduits 24, 25 hydraulically connect the pressurizer 3, in the region of its hot water volume 16, with the hot leg 4 of the thermonuclear plant, at its limb 35.

Since said limb 35 of the hot leg 4 is pipework having a considerable diameter, in particular the first conduit 24 is connected to the hot leg 4 from below, that is, at its lower part, whilst the second conduit 25 is connected to the hot leg 4 from above, that is, at its upper part.

The function of this particular arrangement of the first and second conduits 24, 25, of the pressurized steam operated plant, will emerge in the course of the description of the operation of the depressurization system 1 in the event of an accident.

Because the condenser 10 is placed below the level 17 of the water volume 16 inside the pressurizer 3, and because the circuit consisting of the succession of the third link pipe 21, the condenser 10, the first injection pipe 22, the hot leg 4 and the fourth link pipe 24 is open, the condenser 10 is completely flooded by water, from the pressurizer 3, which fills the whole of the aforesaid circuit up to a point, in the third link pipe 21, located at the same height as said level 17.

The depressurization system 1 described above comprises a pipeline, made from the succession of the first, second and third link pipes 19, 20, 21 and the injection pipe 22, which is connected to said steam headspace 18 of the thermonuclear plant and which forms a closed loop around said nuclear plant, i.e. between said steam headspace 18, contained in the pressurizer 3, and said pressurized vessel 2.

The depressurization system 1 furthermore comprises a delivery pipe 26 which connects the lower part 8 of said tank 5, filled with cold, borated water, and said thermonuclear plant, in this illustrative embodiment in the region of its cylindrical vessel 2.

The depressurization system 1 then comprises, on said delivery pipe 26, a siphon 27.

Said siphon 27 comprises a rising limb 27a, an upper limb 27b and a falling limb 27c which continues downwards.

The upper limb 27b is located above the level 6 of the cold water contained in the main tank 5, so that the cold water from said main tank 5 fills up the delivery pipe 26 to a point in the rising limb 27a, stationed at the same height as the level 6.

As stated earlier, the upper limb 27b of the siphon 27 is located above the first link pipe 19.

Below said level 6 the throat 13 of the ejector 9 is connected to said delivery pipe 26, at a point following the siphon 27 starting from the main tank 5, by a permanently open pressure relief pipe 28.

On the third link pipe 21 of said pipeline forming said closed loop around the thermonuclear plant, the system 1 comprises a first siphon-type hydraulic shutoff 32, close to the inlet collector 14 of the condenser 10 and completely below the latter.

Said siphon-type hydraulic shutoff 32 in fact has a falling limb 32a, a lower limb 32b and a rising limb 32c, following which the third link pipe 21 feeds into the inlet collector 14 of the condenser 10.

Furthermore, following said pressure relief pipe 28, the system 1 comprises, on the delivery pipe 26, a second siphon-type hydraulic shutoff 29 close to the pressurized vessel and placed completely below the condenser 10 and also below the lower limb 32b of the first siphon-type hydraulic shutoff 32.

Said second hydraulic shutoff 29 in fact has a falling limb 29a, a lower limb 29b and a rising limb 29c, following which the delivery pipe 26 feeds into the pressurized vessel 2 via a sprayer 31.

The depressurization system 1 then comprises an auxiliary pipe 33 which hydraulically connects the outlet collector 15 of the condenser 10 to the pressurized vessel 2.

On the auxiliary pipe 33 the system 1 comprises a secondary tank 34 which is completely superelevated with respect to the condenser 10 and is placed entirely below the level 17 of the water inside the pressurizer 3.

With reference in particular to FIG. 1, the liquid level 17 inside the pressurizer 3, which contains the steam headspace 18 of the thermonuclear plant, is produced during normal operation.

On the occurrence of an accident causing a loss of water content from the thermonuclear plant, the liquid level 17 falls inside the pressurizer 3 and also in the third link pipe 21.

On account of the presence of the first siphon-type hydraulic shutoff 32, however, even when the liquid level 17 falls below the condenser 10 and, even before that, below the secondary tank 34, these latter do not drain, remaining completely swamped with water from the plant. This is because the hydraulic seal which is produced in the condenser 10, in the tank 34, in the injection pipe 22 and in the auxiliary pipe 33, is less than pressure weighing on the declining level 17 inside the pressurizer 3 and the third link pipe 21.

Figure 2:
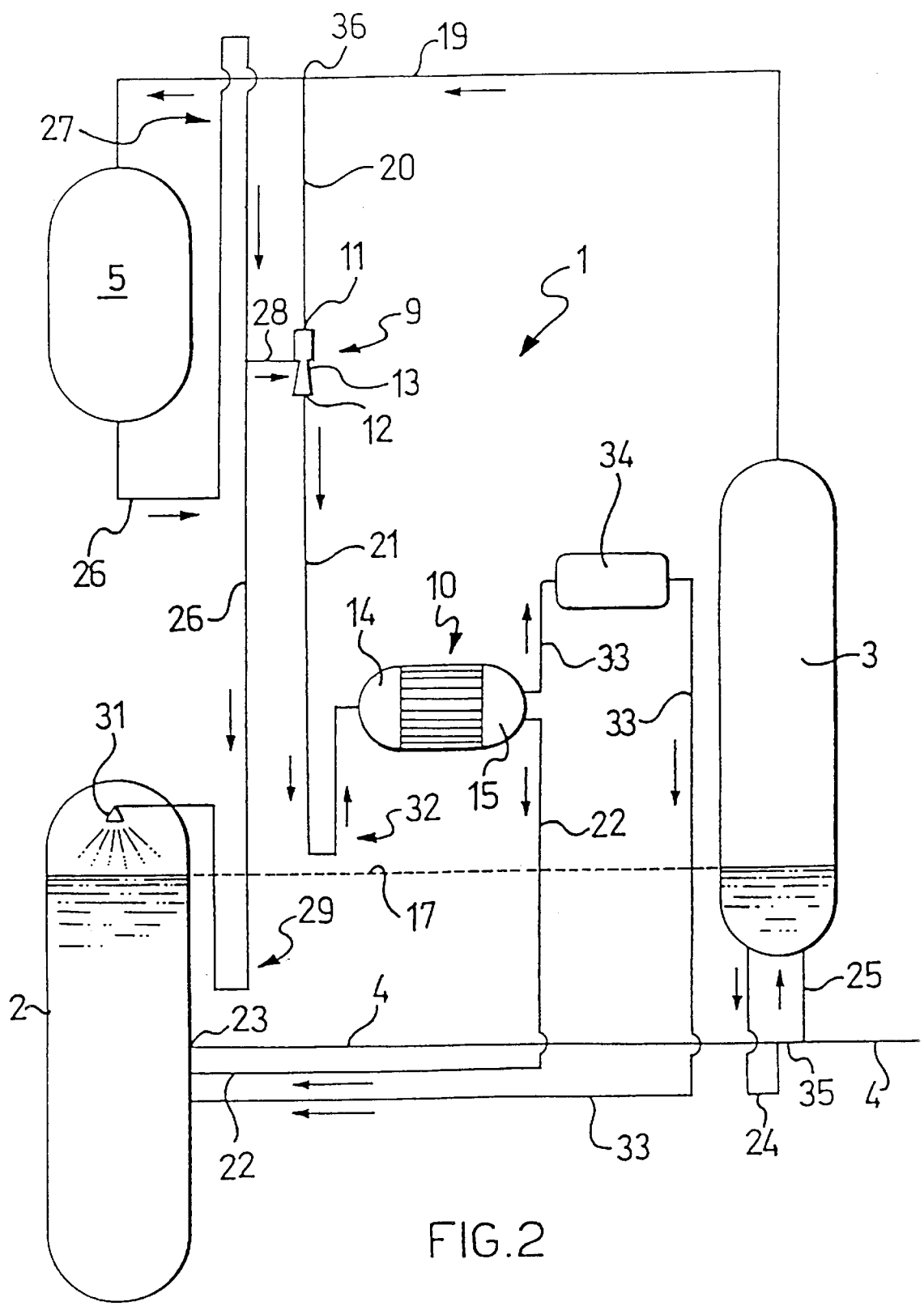

When the liquid level 17 falls below the lower limb 32b of the siphon-type hydraulic shutoff 32 (FIG. 2), there is drainage of the condenser 10 through the injection pipe 22.

The hydraulic thrust which brings about said drainage is produced by the hydraulic seal determined by the difference in altitude between the declining liquid level 17, situated below the lower limb 32b of the first siphon-type hydraulic shutoff 32, and the lower limb 32b.

At this point the condenser 10 is swamped solely by the steam, from the thermonuclear plant, which condenses.

Hence, further water gathers in the outlet collector 15 and prevents the drainage of the secondary tank 34 through the auxiliary pipe. This is because the auxiliary pipe 33 and the tank 34 constitute a kind of siphon, drainage of which is blocked by the water from the outlet collector 15.

The incondensible gases, which are always present in some quantity in pressurized steam operated plant and are present in particular in thermonuclear plants where they are produced by hydrolysis, collect in the outlet collector 15.

When this happens the secondary tank 34 can drain through the auxiliary pipe 33 and the injection pipe 22 and receives all the incondensible gases present in the condenser 10.

By virtue of the aforesaid provisions, the condenser 10 can operate immediately at maximum capacity and rapidly condenses, inside the tube bundle 30, the steam that is present and this brings about a natural circulation of steam inside the pipeline consisting of the succession of the first, second and third link pipes 19, 20, 21 and the injection pipe 22, which forms a closed loop around the thermonuclear plant, and hence also through the ejector 9.

Said natural circulation of steam triggers the injection under gravity of the cold water contained in the superelevated main tank 5, in the manner which will be explained below.

The passage of the steam through the ejector 9 causes a reduction in pressure in its throat 13 which sucks the steam contained in the delivery pipe 26 through the permanently open pressure relief pipe 28, thus also raising the water contained in the rising limb 27a of the siphon, until it passes the upper limb 27b.

When this is reached the siphon 27 is triggered, the water from the tank 5 being subjected to a hydraulic thrust caused by the difference in altitude between the level 6 of the water inside the tank 5 and the declining liquid level 17, so that the water from the tank 5 is injected, under simple gravity, through the delivery pipe 26 and directly into the pressurized vessel 2 where it is then sprayed by the sprayer 31.

This achieves rapid condensation of the steam present, bringing about depressurization of the whole of the thermonuclear plant.

The pressure reduction in the throat 13 of the ejector 9 does not likewise suck the steam contained in the pressurized vessel 2 through the sprayer 31 because of the presence of the second siphon-type hydraulic shutoff 29 which remains full of water even when the first hydraulic shutoff 32 has drained, it being at a lower level.

When the accident which has occurred is, for example, a rupture of limited cross section in the plant in the region of said steam headspace 18, the steam which escapes from the thermonuclear plant comes, completely or in part, directly from the pressurized vessel 2 where it is generated on account of the nuclear decay reactions which produce residual heat.

This steam, in order to reach the rupture, travels along the hot leg 4 and enters at the bottom of the pressurizer.

This situation is brought about with ease if, on account of the internal production of steam due to the rise in temperature, the level of the water inside the pressurized vessel 2 falls below the aperture 23 from which the hot leg 4 branches off.

In this situation the hot leg 4 will contain a steam headspace and a part flooded with water originating from the hot water volume 16 of the pressurizer 3.

The flow of steam from the pressurized vessel 2 might then oppose the fall in the water contained in the pressurizer 3.

Such a situation could prejudice the correct operation of the depressurization system 1 since the fall in the liquid level 17 could be delayed with consequent non-opening of the first siphon-type hydraulic shutoff 32 which sets the entire system 1 into motion.

Furthermore, in the case of a thermonuclear plant, the risk would be incurred that the fuel elements contained in the cylindrical vessel 2 would be uncovered of coolant, with devastating consequences.

This drawback finds a solution in the fact that the circulation of the steam generated in the cylindrical vessel 2 finds an outlet through the second conduit 25 which, being connected to the hot leg 4 above the latter at its limb 35, communicates directly with the steam headspace contained in the hot leg 4.

In fact the first and second conduits 24, 25 constitute a looped circuit, which also comprises the limb 35, inside which is a portion of fluid in the gaseous and lighter state, the steam in the second conduit 25, and a portion of fluid in the liquid and heavier state, the water from the first conduit 24.

The difference in density of the fluids in the various conduits 24, 25 sets up a natural circulation which enables the steam to reach the pressurizer 3 and, simultaneously, enables the water from the pressurizer 3 to flow into the hot leg 4, through its limb 35, and from there to the pressurized vessel 2.

The depressurization system 1 described above can be subjected to modifications and simplifications.

For example, with the second hydraulic shutoff 29 still present, the injection pipe 22, the auxiliary pipe 33 and the delivery pipe 26 can be connected directly to the hot leg 4 of the pressurized steam operated plant.

Furthermore, the delivery pipe 26 upstream of the pressure relief pipe 28 can be dispensed with, the third link pipe 21 and the injection pipe 22 being provided as a path for the injection, under gravity, of cold water from the tank 5, and a siphon-type hydraulic shutoff, similar to that provided in the present illustrative embodiment on the delivery pipe 26, being arranged on the first injection pipe 22 at a level below that of the first hydraulic shutoff 32.

Moreover, the outflow of water from the tank 5 can be slowed down by arranging suitable head losses in the delivery pipe 26.

In addition to the advantage mentioned above the pressurized steam operated plant depressurization system according to the invention is able to cope with any variety of accident which requires the rapid depressurization of the plant.

In particular, by virtue of the design adopted for the pressurized steam operated plant, the steam circulating in the depressurization plant is prevented from impeding the flows of hot or cold water which are induced in the depressurization system according to the invention.

Furthermore, the triggering of the injection, under gravity, of water takes place even in the presence of incondensible gases mixed in the steam, that were previously dissolved in the water of the plant and subsequently liberated by the reduction in pressure or produced therein by hydrolysis.

Moreover, the present invention is suitable for a wide variety of pressurized steam operated plants, including any nuclear plant operated with pressurized or boiling water and thus requiring the fitting of components of simple design.

In order to satisfy particular local contingent exigencies, a person skilled in the art will be able to make numerous variants to the depressurization system according to the invention, all included, however, within the scope of protection of the invention, as defined by the following claims.

We claim:

1. Depressurization system (1) for pressurized steam operated plant (2, 3, 4) employing the injection, under gravity, of cold water contained in a tank (5) which is superelevated with respect to said plant (2, 3, 4), said plant (2, 3, 4) comprising a steam headspace (18) defined by a liquid level (17) during normal operation, said depressurization system (1) comprising:

a pipeline (19, 20, 21, 22), connected to said steam headspace (18) and forming a closed loop around said plant (2, 3, 4);

a condenser (10), placed below said liquid level (17), which has an inlet collector (14) and an outlet collector (15);

a delivery pipe (26) which connects said tank (5) with said plant (2, 3, 4);

an ejector (9), on said pipeline (19, 20, 21, 22), which has an entrance section (11), an exit section (12) and a throat (13);

a pressure relief pipe (28) which connects said delivery pipe (26) and the throat (13) of said ejector (9);

said injection being triggered by a natural circulation of steam in said closed loop caused by the condensation of steam from the plant (2, 3, 4) in said condenser (10) during the occurrence of an accident, characterised in that it comprises:

a first siphon-type hydraulic shutoff (32), on said pipeline (19, 20, 21, 22) and arranged close to the inlet (14) of said condenser (10);

a second siphon-type hydraulic shutoff (29) on said delivery pipe (26) and placed close to the pressurized steam operated plant (2, 3, 4);

said second siphon-type hydraulic shutoff (29) being below said first siphon-type hydraulic shutoff (32).

2. Depressurization system (1) according to claim 1, comprising an auxiliary pipe (33), which connects the outlet collector (15) of the condenser (10) and the pressurized steam operated plant (2, 3, 4), and a further tank (34), completely superelevated with respect to the condenser (10) and placed entirely below said liquid level (17), on said auxiliary pipe (33).

3. Depressurization system (1) according to claim 1, wherein said pipeline comprises:

a first link pipe (19), between said steam headspace (18) and said tank (5);

a second link pipe (20), between said first link pipe (19) and said entrance section (11) of said ejector (9);

a third link pipe (21), between said exit section (12) of the ejector (9) and said inlet collector (14) of the condenser (10);

an injection pipe (22), between said outlet collector (15) of the condenser (10) and the pressurized steam operated plant (2, 3, 4);

said second siphon-type hydraulic shutoff (29) being arranged on said third link pipe (21).

4. Depressurization system (1) according to claim 1, comprising a siphon (27) on said delivery pipe (26), said siphon (27) comprising a rising limb (27a), an upper limb (27b) and a failing limb (27c), said upper limb (27b) being above the level (6) of the cold water contained in the superelevated tank (5).

5. Depressurization system (1) according to claim 1, wherein said delivery pipe (26) feeds into the pressurized steam operated plant (2, 3, 4) via a sprayer (31).

6. A depressurization system according to claim 1, wherein the pressurized plant further comprises a pressurized vessel, a pressurizer (3), a hot leg comprising at least one limb (35), a first conduit (24) which connects said pressurizer (3) with said hot leg (4) at said limb (35), a second conduit (25) which connects said pressurizer (3), and said hot leg (4) at said limb (35), said first conduit (24) being connected to said hot leg (4) at its lower part, and said second conduit (25) being connected to said hot leg (4) at its upper part.

* * * * *